US009171707B2

(12) United States Patent
Syka et al.

(10) Patent No.: US 9,171,707 B2
(45) Date of Patent: Oct. 27, 2015

(54) REAGENTS FOR ELECTRON TRANSFER DISSOCIATION IN MASS SPECTROMETRY ANALYSIS

(75) Inventors: John E. P. Syka, Charlottesville, VA (US); Philip D. Compton, Charlottesville, VA (US); Donald F. Hunt, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 921 days.

(21) Appl. No.: 13/391,331

(22) PCT Filed: Sep. 2, 2010

(86) PCT No.: PCT/US2010/047620
§ 371 (c)(1),
(2), (4) Date: Feb. 20, 2012

(87) PCT Pub. No.: WO2011/028863
PCT Pub. Date: Mar. 10, 2011

(65) Prior Publication Data

US 2012/0156792 A1 Jun. 21, 2012

Related U.S. Application Data

(60) Provisional application No. 61/239,328, filed on Sep. 2, 2009.

(51) Int. Cl.
*G01N 24/00* (2006.01)
*H01J 49/00* (2006.01)

(52) U.S. Cl.
CPC ............ *H01J 49/0072* (2013.01); *Y10T 436/24* (2015.01)

(58) Field of Classification Search
CPC . H01J 49/0072; H01J 49/423; H01J 49/0077; H01J 49/0095; H01J 49/022; H01J 49/062; H01J 49/063; H01J 49/142; H01J 49/422; H01J 49/424; H01J 49/00; H01J 49/0027; H01J 49/0045; G01N 33/6848
See application file for complete search history.

(56) References Cited

U.S. PATENT DOCUMENTS

2005/0199804 A1 9/2005 Hunt et al.
2009/0023926 A1 1/2009 Southern et al.

FOREIGN PATENT DOCUMENTS

WO WO-2011028863 A1 3/2011

OTHER PUBLICATIONS

"International Application Serial No. PCT/US2010/047620, Search Report mailed Dec. 20, 2010", 4 pgs.
"International Application Serial No. PCT/US2010/047620, Written Opinion mailed Dec. 20, 2010", 9 pgs.
Zhang, Xue-Hua, et al., "Photophysical, electrochemical, and photoelectrochemical properties of new azulene-based dye molecules", J. Mater. Chem, 7, (2007), 642-649.
"International Application Serial No. PCT/US2010/047620, International Preliminary Report on Patentability mailed Mar. 15, 2012", 6 pgs.

*Primary Examiner* — Yelena G Gakh
(74) *Attorney, Agent, or Firm* — Schwegman Lundberg & Woessner, P.A.

(57) ABSTRACT

The invention provides improvements in reagents for use in electron transfer dissociation ionization techniques for use in mass spectrometry, particularly for sequencing peptides and proteins using mass spectrometric techniques involving electrospray ionization and MS/MS characterization of fragment ions. The novel reagents used in the inventive methods allow for more effective determination of protein sequences, especially of long peptides or post-translationally modified protein fragments. Use of the polycyclic aromatic hydrocarbons azulene, homoazulene, and acenaphthylene, and homodimers and heterodimers thereof, are described.

8 Claims, 1 Drawing Sheet

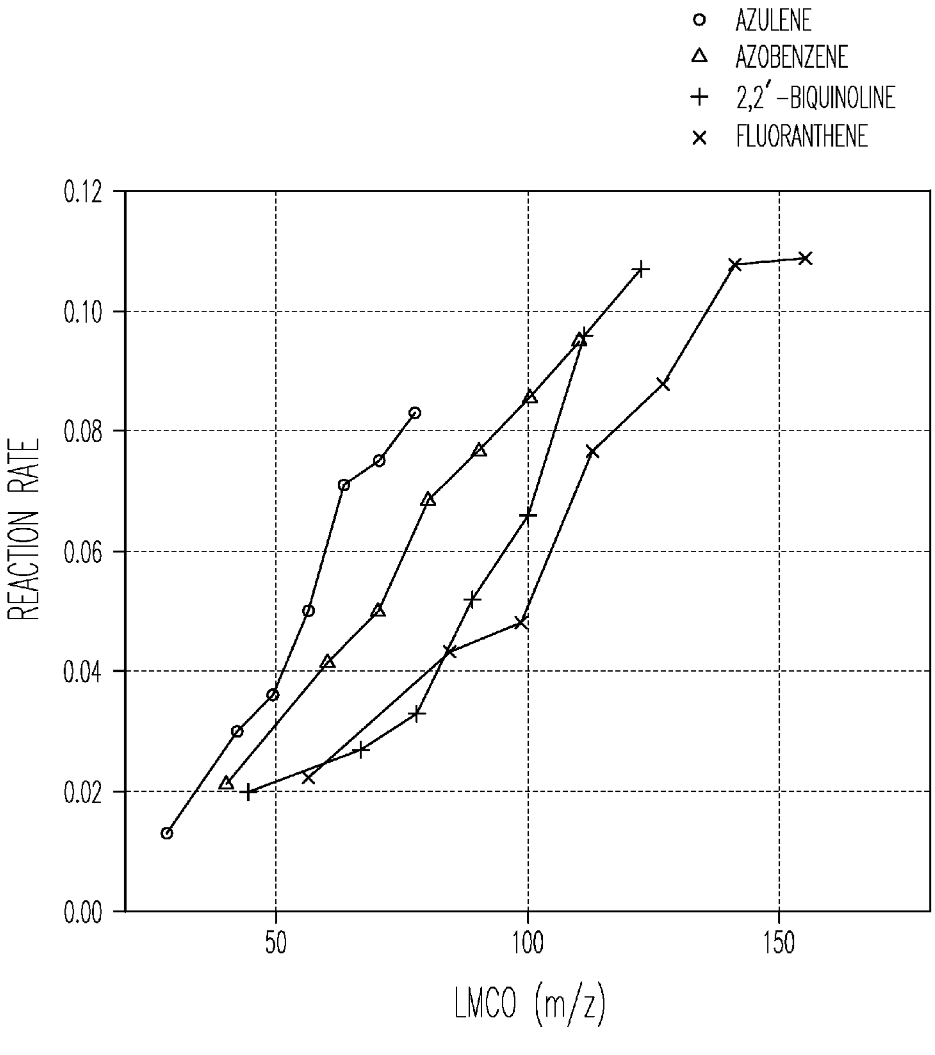
AZULENE
AZOBENZENE
2,2′-BIQUINOLINE
FLUORANTHENE
0.12
0.10
0.08
0.06
0.04
0.02
0.00
REACTION RATE
50
100
150
LMCO (m/z)

SEQUENCE LISTING

```
<160> NUMBER OF SEQ ID NOS: 1

<210> SEQ ID NO 1
<211> LENGTH: 10
<212> TYPE: PRT
<213> ORGANISM: Homo sapiens

<400> SEQUENCE: 1

Asp Arg Val Tyr Ile His Pro Phe His Leu
 1               5                  10
```

REAGENTS FOR ELECTRON TRANSFER DISSOCIATION IN MASS SPECTROMETRY ANALYSIS

U.S. GOVERNMENT RIGHTS

This invention was made with United States Government support under Grant Nos. GM37537 and 1 F32 RR018688-01 awarded by the National Institutes of Health as well as MCB-0209793 awarded by NSF. The United States Government has certain rights in the invention.

CROSS-REFERENCE TO RELATED APPLICATIONS

This application is a U.S. National Stage Filing under 35 U.S.C. 371 from International Patent Application Serial No. PCT/US2010/047620, filed on Sep. 2, 2010, and published as WO 2011/028863 on Mar. 10, 2011, which claims the priority of U.S. Ser. No. 61/239,328, filed Sep. 2, 2009, the contents of which are incorporated by reference herein in their entirety.

BACKGROUND

Mass spectrometry has become a powerful technique for the determination of the structure of organic compounds, and has been applied to polypeptides (proteins) to ascertain the amino acid sequences of such polymers.

Electron Transfer Dissociation (ETD) is a gas-phase ion/ion oxidation-reduction reaction that utilizes an anionic species to transfer an electron to a multiply charged cation, i.e., a polyprotonated (polycationic) organic or biomolecular compound, usually a polypeptide, resulting in the dissociation of the compound into structurally informative product ions. These dissociation product ions can then be analyzed by any suitable mass spectrometric technique. This is particularly useful when the molecular species is a protein or peptide, as amino acid sequence information can be obtained thereby. In typical implementations of ETD, both the reagent anions and the precursor cations are confined in at least two dimensions within a radio frequency (RF) electrodynamic field.

In the most commonly employed techniques, reagent and precursor (polycationic) ions are simultaneously trapped by the electrodynamic fields within two-dimensional (2D-linear) or three-dimensional RF quadrupole ion trapping devices that also serve as mass analyzers. Generally, ETD reaction kinetics are pseudo first order, as the number density of the reagent ions within the overlapping clouds of trapped reagent and precursor ions is much larger than that of the precursor ions. Therefore the rate of conversion of precursor cations to product cations is approximately proportional to the initial concentrations (number density) of reagent anions (which are relatively stable throughout the reaction period). Utilizing low m/z (mass-to-charge ratio) reagents achieves reaction rates that are faster than those achieved with higher m/z reagents by allowing the ion trap to be operated such that the intensity of RF confinement fields (applied electrode voltage levels) during the reaction are greater, enabling creation of a higher density reagent anion cloud in the confining RF quadrupolar field, and therefore providing correspondingly higher reaction rates, whilst also allowing the retention of low m/z product ions following the ETD reaction by maintaining a sufficiently low m/z (mass-to-charge) cutoff (LMCO). This allows most of the possible C- and N-terminal product ions to be retained by the device. The faster reaction rates allow the mass spectrometer to generate ETD product ion spectra at a higher rate (which translates to shorter effective "scan" times), enabling mass spectrometric methods that can more thoroughly interrogate purified analytes introduced from a chromatographic column. See, for example, U.S. Pat. No. 7,534,622, by certain of the inventors herein.

SUMMARY

The invention is directed to novel methods useful for mass spectrometric determination of organic structures, such as the determination of aminoacid sequences in peptides, involving the use of anionic species of the invention for inducing ETD reactions in polycationic species, such as in polycationic polypeptide ions. In various embodiments, the invention provides advantageous anionic species for inducing ETD in polycationic polypeptide ions, resulting in chain cleavage and detection of fragment ions for aminoacid sequence information with reduced MS/MS scan times, improved ion cloud density, and lower mass cutoffs compared to those available using art methods.

In various embodiments, the invention provides a method of mass spectrometry analysis based on electron transfer dissociation (ETD) of multiply charged organic and/or biomolecular cations, the method comprising the steps of (a) introducing the multiply charged cations into an RF electric field ion containment device of a mass spectrometer; and introducing polycyclic aromatic hydrocarbon anions as gas-phase electron transfer reagents into the ion containment device, wherein the polycyclic aromatic hydrocarbon anions are anions of polycyclic aromatic hydrocarbons selected from the set consisting of azulene, homoazulene, acenaphthylene, a homodimer of any of azulene, homoazulene, or acenaphthylene, and a heterodimer comprising one each of azulene, homoazulene, or acenaphthylene; or any mixture thereof; and then (b) mixing the introduced polycyclic aromatic hydrocarbon anions or derivative anions thereof, and the multiply charged cations or derivative multiply charged cations thereof, wherein the derivative anions and the derivative multiply charged cations are generated within the ion containment device during performance of the method, for electron transfer from the polycyclic aromatic hydrocarbon anions or the derivative anions thereof to the multiply charged cations or the derivative multiply charged cations thereof, to induce cleavage of covalent bonds and produce fragment and/or dissociation product cations; and mass (m/z) analyzing and detecting said fragment and/or dissociation product cations or cations derived from the fragment and/or dissociation product cations for mass spectrometric analysis.

In various embodiments, the invention provides a method for analyzing the amino acid sequence of a polypeptide, the method comprising introducing multiply charged polypeptide cations into an RF containment device; and introducing gas-phase anions into the RF containment device, wherein the anions are radical anions derived from a polycyclic aromatic hydrocarbon selected from the set consisting of azulene, homoazulene, acenaphthylene, a homodimer of any of azulene, homoazulene, or acenaphthylene, and a heterodimer comprising one each of azulene, homoazulene, or acenaphthylene, or any phenyl mono- or plurisubstituted derivative thereof; or any mixture thereof; and then mixing gas-phase anions and multiply charged polypeptide cations for electron transfer from the anions to the multiply charged polypeptide cations, thus inducing the production of electron transfer dissociation product ions; then terminating the reactions by physically separating the remaining gas-phase anions from the electron transfer product cations; and conducting m/z analysis of cations remaining in the RF containment device to determine the amino acid sequence of the polypeptide.

BRIEF DESCRIPTION OF THE FIGURES

FIG. 1 shows experimentally determined ETD reaction rates vs. the magnitude of applied RF voltages used to generate the quadrupolar radial confinement field for a RF quadrupole linear ion trap, expressed in terms of low m/z stability limit, referred to as the low mass cutoff (LMCO). Data are shown for selected reagent anions including a radical anion for use in practicing various embodiments of methods of the invention, of azulene (m/z 128). The rate of the reaction was measured by monitoring the decay in precursor cation abundance (+3 charge state of the polypeptide angiotensin I) as a function of reaction time for various amplitudes of applied field quadrupole imposing voltages. The reaction rates for ETD reagent anions, azobenzene (m/z 182), fluoranthene (m/z 202) and 2,2'-biquinoline (m/z 256) are shown for comparison. Within the limits of experimental determination, the same number of reagent ions were used for each different reagent ion species. The study was performed within the RF 2D quadrupole (linear) ion trap of a modified Thermo Fisher Type LTQ type radial ejection RF quadrupole linear ion trap mass spectrometer.

DETAILED DESCRIPTION

The present invention is directed to methods for carrying out ionization and dissociation reactions useful in the mass spectrometric analysis of organic molecules primarily including biomolecules such as peptides and proteins. In various embodiments, the invention provides a new set of ETD reagents that are advantageous for a variety of reasons as discussed below. The use of certain compounds disclosed herein for practice of the inventive method provides superior analytical results using electrospray ionization/mass spectrometry analytical techniques, particularly in the analysis of protein fragments, such as peptides produced by enzymatic digestion of proteins isolated from biological samples. The reagents disclosed herein for practice of the inventive methods have superior chemical and physical properties for performing ETD, simplifying instrument design and operation.

ETD is a technique that can be used, among other things, for the fragmentation of multiply charged proteins and peptides prior to mass spectrometric analysis. Due to the difficulty in obtaining the amino acid sequence of peptides and proteins by other methods, especially when a limited supply of the material is available, use of tandem mass spectrometry to determine the mass to charge ratio (m/z) of product ions derived from the analyte material is highly advantageous.

However, there are difficulties associated with tandem mass spectrometric analysis of proteins/peptides, some of which can be overcome through the use of ETD ionization techniques. The methods disclosed herein provide an improvement on established ETD-based MS/MS techniques, such as are disclosed in U.S. Pat. Nos. 7,534,622 and 7,749,769, incorporated herein by reference. In a typical ETD analysis, peptides, such as those resulting from enzymatic digestion of mixtures of proteins, are separated by high performance liquid chromatography (HPLC), ionized for analysis via electrospray ionization (ESI), and introduced into a mass spectrometer. A mass spectrometric method is implemented that analyzes the incoming ions. Generally, this method will first mass analyze all incoming ions (full MS). Next, ions are chosen in a data-dependent manner based on this initial scan using a selection criterion specified by the user (e.g., the five most intense m/z peaks in the "full MS spectrum" that are not on an exclusion list) and are then subsequently individually m/z selected and dissociated and mass analyzed to produce product ion mass spectra (also referred to as MS/MS spectra or tandem mass spectra) that are specific to each selected precursor m/z. This procedure of a single "full scan" mass spectra followed by some number of product ion spectra of data-dependently selected precursors is repeated continuously throughout the chromatographic separation. By such techniques, many components of highly complex mixtures of peptides can be separated and subjected to MS/MS analysis. By applying well known techniques of searching the acquired MS/MS spectra against databases of aminoacid sequences of known protein or peptides, the identities of many components of the complex peptide mixture can be determined.

From the preceding description of on-line LC MS/MS analyses of peptides, it is evident that the time required to generate individual MS/MS spectra dictates the number of MS/MS experiments that can be accommodated in a run to allow appropriate sampling of the incoming HPLC eluant. Thus, maximizing the rate of generation of MS/MS spectra is highly advantageous.

Generally, in implementations of ETD where the reagent anions and the precursor cations are simultaneously trapped in all three dimensions and allowed to mix, the reaction kinetics are pseudo first order, as the number density (number of ions per unit volume) of the reagent ions within the overlapping clouds of trapped reagent and precursor ions is much larger than that of the precursor ions. Therefore the rate of conversion of precursor cations to product cations is thus approximately proportional to the initial population of reagent anions (which is relatively stable throughout the reaction as the initial total charge of precursor ion population is insufficient to neutralize more than 10%-20% of the reagent anions).

The range of m/z values that can be simultaneously confined in an ion trap is dictated by the operating parameters of the device. These parameters are typically reduced to combined Mathieu stability parameters a and q. In an RF-only quadrupole ion trap, the parameter a, which relates to intensity of the DC component of the quadrupole field, is zero. The parameter q is directly proportional to the applied RF amplitude and inversely proportional to m/z. The natural stability limit for ions occurs at a q of 0.908. Ions residing at a value of $q>0.908$ are unstable and will be ejected from the ion trap. Since q is inversely proportional to m/z, lower m/z species reside at higher q values than higher m/z species. The strength of ion confinement around the RF quadrupole field center increases from zero at $q=0$ reaching a maximum in the neighborhood of $q=0.78$, and then drops to zero at approximately $q=0.908$, which is referred to as the stability limit.

For the particular implementation of RF only ion trapping utilized by RF linear quadrupole ion trap used to obtain the data disclosed herein below, which involved applying secondary RF voltages at ½ the quadrupole field frequency to the end lenses of the linear trap to impose axial ion confinement during the ETD ion-ion reactions, a region of poor ion confinement is introduced leading to considerable ion loss on the timescale of the ETD reactions for ions confined at q values between $q=0.6$ and $q=0.7$.

During an ETD reaction, two ion species of differing m/z values are simultaneously contained in the ion trap. As a result of reaction, many different product ion species across a range of m/z values will be generated. If the operational parameters of the trap place these product ions q values above the stability limit, q=0.908, they will be lost from the trap and therefore not detectable in subsequent mass analysis. The m/z corresponding to q=0.908 is known as the low-mass cutoff (LMCO).

Using reagents that have a lower m/z value is beneficial. Lower m/z reagent ions can reside at higher q values during an ETD reaction than higher m/z reagents ions while maintaining the same LMCO. Further, for a given LMCO, higher q values within the limits described above may correspond to stronger ion confinement and, therefore, more dense reagent ion clouds. Thus, lower m/z reagents can promote higher rates of reaction while maintaining an LMCO that is acceptable for proteomic investigations.

Reagents chosen to take advantage of these principles must be capable of transferring an electron to the polypeptide cation. It is well known in the field that reagents can act to either transfer an electron, or to abstract a proton (a process known as a proton transfer reaction (PTR)). The partitioning of reagents between these two reaction pathways is dependent on the chemical properties of the reagent. The inventors herein have recognized that a subset of polycyclic aromatic hydrocarbons exhibiting favorable ETD/PTR properties contain a five-membered rings: examples include azulene and acenaphthylene. It is further anticipated that homoazulene, a polycyclic hydrocarbon not containing a five-membered ring but having very similar pi-electronic properties to azulene, will also exhibit desirable properties for an ETD reagent. The rigid structure of aromatic ring systems leads to a high degree of Franck-Condon overlap. The electron affinity of azulene is ~16 kcal/mol, placing it in the optimal range to perform ETD (between 10 and 20 kcal/mol). Thus, appropriate reagents for ETD may contain these characteristics.

Structures of ETD reagents for practice of the methods of the invention include:

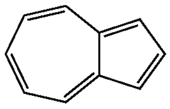

azulene

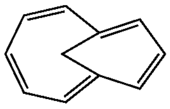

homoazulene

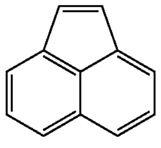

acenaphthylene

The compound azulene has been found by the inventors herein to provide many desirable characteristics for use as an ETD reagent. Many of the reagents that have been found to have favorable ETD reactivity suffer from being hazardous to human health by being toxic and/or carcinogenic. This requires instrument manufacturers to design in safety mechanisms such as delivering reagent in sealed vials that are directly inserted into the reagent source in order to prevent customer contact with these reagents and maintaining these vials at sub-atmospheric pressures so in the advent of a leak in the reagent delivery system, gaseous regent won't be released into the laboratory environment. Azulene, commonly found in cosmetics, is considerably less toxic than previously utilized reagents and is not commonly considered to be a carcinogen. Therefore, for the safety of operators utilizing ETD equipment and for the ease of instrument design and construction, azulene represents an improvement over previously utilized reagents.

Due to its structure, the azulene radical anion is far more likely to react with multiply protonated peptides or proteins by transferring an electron (the electron transfer reaction being referred to herein as ET) than abstracting a proton. Experimental data indicate that the azulene (~90%) is as likely, and in some cases more likely, to react by electron transfer than other ETD reagent anions described in the literature such as fluoranthene (~90% ET), azobenzene (~70% ET) and, anthracene (~20% ET). This penchant for transferring an electron is thought to be attribuatble to the electron affinity (16 kcal/mol) and the favorable Franck-Condon overlap for azulene.

At room temperature and pressure, neutral azulene sublimes, generating a vapor pressure at about 20° C. of 2.57 mTorr. In the operation of ETD instrumentation, the neutral reagent molecules are often transported in a controlled manner into the reagent ionization source via a flow of a carrier gas. The molecular reagent must be delivered to the ion source at sufficient concentration such that a sufficiently high flux of reagent anions can be generated to effect ETD reactions on a suitable time scale. For embodiments involving co-trapping of both the reagent and precursor ions, this means that the reagent source must deliver a suitable number of reagent ions to the ion trap within a time that is relatively small compared to the timescale of the entire the ETD MS/MS experiment. For the ETD-capable mass spectrometers (such as modified versions of linear ion trap mass spectrometers utilizing sub atmospheric glow-discharge reagent ionization sources), the high vapor pressure of azulene enables a sufficiently high partial pressure of azulene to be delivered to the reagent ionization source without need for elevating the temperature of the reagent, such that the time required for reagent ion injection into the trap is on the order of <2 ms for the approximately 300,000-1,200,000 reagent ions typically used in each ETD experiment. It is desirable that the molecular reagent must be of sufficient concentration in the carrier gas to provide adequate ion current to facilitate short anion injection times in to the ion trap whilst accumulating sufficiently large populations of trapped ions so as to approach the maximum attainable ion cloud density so as to provide high ion-ion reaction rates. Minimizing reagent ion injection (accumulation) times and ion-ion reaction times reduces the time required to perform the entire MS/ETD/MS experiment and increases the number of precursor cation species that may be subject to MS/ETD/ETD analysis per unit time. For the instrument utilized for the data provided herein, the high vapor pressure of azulene allowed for reagent injection times on the order of 2 ms or less without need for elevating the temperature of the reagent to increase the vapor pressure. The reagent inlet could be regulated to a temperature slightly (e.g., 5-10° C.) above ambient system temperature. Such a relatively low operating temperature for the reagent inlet reduces or eliminates the need to shield the inlet system from the user to avoid burning. In certain embodiments, the use of azulene as the ETD reagent offers the potential of either eliminating the need for heaters entirely or at least greatly reducing the heater power and operating temperature of the reagent inlet, hence simplifying instrumental design and improving safety by reducing the risk of burning to the operator. Also, azulene's high vapor pressure makes it less likely to condense and accumulate on the surfaces found inside of the mass spectrometer apparatus, particularly surfaces along the reagent ion transmission path (the reagent ionization region and any lens and RF ion guide electrodes), which should aid in keeping the instrument clean and will thereby extend the interval, between servicing the instrument for cleaning of these surfaces.

The radical anion of azulene has m/z 128. Currently, the most commonly used reagents are fluoranthene (m/z 202) and azobenzene (m/z 182). Since azulene is a lighter (lower m/z) reagent, it can be held at a higher q during the ion/ion reaction, resulting in reaction rates nearly twice that of fluoranthene while maintaining a lower LMCO. In current commercial implementations of ETD, fluoranthene is held at q=0.4 during the ion/ion reaction. This results in an LMCO of ~90 m/z. However, since azulene is a lighter reagent, it can be held at q=0.55 during the reaction while maintaining an LMCO of ~80 m/z. FIG. 1 shows experimentally determined rates of ETD reaction as a function of the LMCO during the ion-ion reaction for comparable populations of various ETD reagent anions of differing m/z ratios. From this FIGURE, it is apparent that azulene maximizes at a low value of LMCO and, additionally, that no other reagents of higher m/z can provide an equivalent rate of reaction at that value of LMCO. Thus, azulene and related compounds sharing azulene's properties are especially well suited for use as ETD reagents.

In various embodiments, azulene can be contained in a vessel that is fed by an influx of a suitable carrier gas. It should be noted that this vessel can be heated or otherwise temperature controlled, but it is not a necessity. The gas flow serves to transport azulene molecules to the ionization region of an ion source. The ion source may be any device that enables the formation of electrons of near thermal energies (0.01-1 eV). The neutral azulene molecules will readily capture such near thermal energy electrons, generating the radical anion of azulene. The ionization region may be disposed within or proximate to the skimmer (low-vacuum) chamber of a mass spectrometer, as described in U.S. patent application Ser. No. 12/473,570 by Shabanowitz et al., the contents of which are incorporated by reference herein. The resultant ion beam can then be directed into an portion of the mass spectrometer apparatus configured for ion trapping. In certain embodiments, it can be beneficial to pass the ion beam through a quadrupole mass filter or other m/z selection device to remove undesirable species formed in the reagent ionization region. The number of reagent anions injected into the ion trap can be optimized using an automatic gain control technique or other suitable expedient. The applied RF potential on the ion trap will be adjusted to maximize the ion-ion reaction rate while minimizing the loss of low m/z ions. Resultant ETD product ions, or ions derived there from (e.g., by one or more subsequent stages of m/z selection and/or dissociation) are then mass analyzed and detected via a suitable means.

It is noted that the mixing of azulene anions with analyte cations to produce ETD or other desired ion/ion reaction can be effected in any suitable region of the mass spectrometer and need not occur within an ion trap that simultaneously confines the cations and anions, in the preferred manner disclosed in U.S. Pat. No. 7,534,622. In particular, and without limitation, mixing of the azulene anions with the analyte cations and the consequent reaction can take place in a RF ion containment device in which neither, or only one, of the anions and cations are confined in all dimensions, as described in Liang et al, *Transmission Mode Ion/Ion Electron-Transfer Dissociation in a Linear Ion Trap, Anal. Chem.*, vol. 79, pp. 3363-3370 (2007), the disclosure of which is incorporated herein by reference. Examples of such multipole structures include conventional ion guides, constructed from pairs of elongated electrodes to which different phases of an RF voltage are applied, as well as stacked ring ion guides constructed from a multiplicity of aligned apertured electrodes coupled to an RF voltage source, all of which are well known in the mass spectrometry art. It is further noted that ETD and subsequent analytical scanning/detection can be implemented within a single structure, such as a linear ion trap, or can alternatively be carried out in physically separate structures/analyzers.

It should be still further noted that ETD, utilizing the reagents described herein, may be combined with other reaction or dissociation techniques, such as collision induced dissociation (CID) or proton transfer reaction (PTR) to accomplish desired objectives. For example, and without limitation, ETD may be followed by a subsequent stage of PTR to reduce the charge states of the ETD product ions. Selection of the appropriate dissociation/reaction technique or combination of dissociation/reaction techniques may be performed in a data-dependent manner, as disclosed in U.S. Patent Application Publication No. 2008/0048109 for "Data-Dependent Selection of Dissociation Type in a Mass Spectrometer" by Schwartz et al., the contents of which are incorporated herein by reference. In other embodiments, precursor ions may be activated prior to ETD, utilizing photo-activation or other suitable technique, in order to improve ETD efficiency or to preferentially cause a selected subset of the precursor ions to undergo fragmentation by ETD.

The properties of azulene that make it an especially advantageous ETD reagent suggest other compounds that may be expected to behave similarly. Homoazulene and acenaphthylene, the structures of which are depicted above, share the rigid structure of azulene and at least acenaphthylene demonstrates high vapor pressure at room temperature. Further, these compounds are similar in mass to azulene.

Compounds containing two aromatic systems containing five-membered rings or pseudo-five-membered rings, which are capable of forming di-radical-2 anions, may also have these favorable characteristics for use as an ETD reagents. An example of such a compound is an azulene homodimer. Since the rate of an ion/ion reaction is dependent on the square of the charge of both the reagent and precursor, a doubly-charged reagent would provide at least a factor of 4 increase in the rate of reaction over singly charged reagents of the same mass. Furthermore, due to the high volatility of azulene and related molecules, a larger system comprised of two azulene subunits would likely still maintain an acceptable degree of volatility and might retain the relatively benign characteristics with regard to human health as azulene. Finally, because the molecule is doubly charged, despite the increased mass, the doubly-charged species of the anion would still be found at m/z 128, affording the benefits of a low m/z reagent discussed previously.

Thus, in various embodiments, the polycyclic aromatic hydrocarbon from which the anion is formed can be azulene, homoazulene, or acenaphthylene. In other embodiments, the polycyclic aromatic hydrocarbon can be a homodimer of any of azulene, homoazulene, or acenaphthylene. By a homodimer is meant a molecule wherein two azulene, two homoazulene, or two acenaphthylene molecules are directly bonded to each other at any position. For example, a homodimer of azulene can include the following structures, among others:

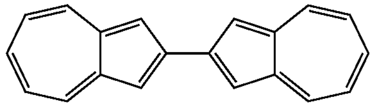

-continued

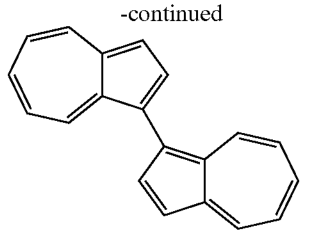

or

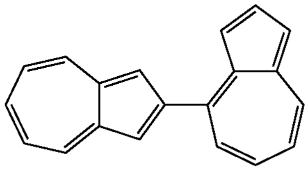

or any other possible structural arrangement of the sort wherein two azulene rings are covalently bonded to each other. Similarly, a homodimer of homoazulene or of acenaphthylene is composed of two of the particular monomeric units directly coupled by a sigma bond between any substitutable carbon atom of one unit and any substitutable carbon atom of another unit. By substitutable is meant a carbon atom bearing a bond to a hydrogen atom that can be replaced to form the dimer.

In various other embodiments the polycyclic aromatic hydrocarbon can be a heterodimer comprising one each of azulene, homoazulene, or acenaphthylene bonded directly together as described above.

In various embodiments, a phenyl mono- or plurisubstituted form of any of these polycyclic aromatic hydrocarbons can be used.

In various embodiments, the polycyclic aromatic hydrocarbon used to form the radical anion for ETD can be a mixture including any of the above compounds in various proportions.

"Angiotensin" (SEQ ID NO 1), is Asp-Arg-Val-Tyr-Ile-His-Pro-Phe-His-Leu.

An "anion" can be a mono-anion, a di-anion, or a multiply charged anion within the meaning herein.

A "radical" is a molecular species containing an unpaired electron within the meaning herein. A "di-radical" is a type of a radical wherein there are two unpaired electrons within a single molecule.

A "multiply charged cation" as the term is used herein refers to an organic molecule bearing more than one positive charge.

The definitions provided in U.S. Pat. No. 7,534,622 are incorporated by reference herein to the extent that they do not conflict with any of the definitions provided herein.

In various embodiments, the invention comprises a method of mass spectrometry analysis based on electron transfer dissociation (ETD) of multiply charged organic and/or biomolecular cations, the method comprising the steps of (a) introducing the multiply charged cations into an RF electric field ion containment device of a mass spectrometer; and introducing polycyclic aromatic hydrocarbon anions as gas-phase electron transfer reagents into the ion containment device, wherein the polycyclic aromatic hydrocarbon anions are anions of polycyclic aromatic hydrocarbons selected from the set consisting of azulene, homoazulene, acenaphthylene, a homodimer of any of azulene, homoazulene, or acenaphthylene, and a heterodimer comprising one each of azulene, homoazulene, or acenaphthylene; or any mixture thereof; and then (b) mixing the introduced polycyclic aromatic hydrocarbon anions or derivative anions thereof, and the multiply charged cations or derivative multiply charged cations thereof, wherein the derivative anions and the derivative multiply charged cations are generated within the ion containment device during performance of the method, for electron transfer from the polycyclic aromatic hydrocarbon anions or the derivative anions thereof to the multiply charged cations or the derivative multiply charged cations thereof, to induce cleavage of covalent bonds and produce fragment and/or dissociation product cations; and mass (m/z) analyzing and detecting said fragment and/or dissociation product cations or cations derived from the fragment and/or dissociation product cations for mass spectrometric analysis.

In various embodiments the multiply charged cations can comprise a multiply charged cation derived from a polypeptide. In various embodiments, a polypeptide sequence can be obtained using the inventive methods that are more informative, accurate, and sensitive than previously used techniques. In various embodiments, particularly informative sequence information for a peptide or protein can be obtained using a method of the invention.

In various embodiments the RF electric field ion containment device can be an RF ion guide.

In various embodiments the RF electric field ion containment device can be an RF ion trap.

In various embodiments the RF ion trap can be a RF linear multipole ion trap, or can be a RF 3 dimensional multipole ion trap.

The methods of the invention are particularly useful for sequencing proteins obtained by peptidase digestion of mixtures of proteins, such as can be obtained from lysates of cells. For example, tryptic fragments derived from trypsin-catalyzed hydrolysis of mixtures of proteins are readily analyzed and sequenced using methods of the invention.

In various embodiments the invention provides a method for analyzing the amino acid sequence of a polypeptide, the method comprising introducing multiply charged polypeptide cations into an RF containment device; and introducing gas-phase anions into the RF containment device, wherein the anions are radical anions derived from a polycyclic aromatic hydrocarbon selected from the set consisting of azulene, homoazulene, acenaphthylene, a homodimer of any of azulene, homoazulene, or acenaphthylene, and a heterodimer comprising one each of azulene, homoazulene, or acenaphthylene, or any phenyl mono- or plurisubstituted derivative thereof, or any mixture thereof; and then mixing gas-phase anions and multiply charged polypeptide cations for electron transfer from the anions to the multiply charged polypeptide cations, thus inducing the production of electron transfer dissociation product ions; then terminating the reactions by physically separating the remaining gas-phase anions from the electron transfer product cations; and conducting m/z analysis of cations remaining in the RF containment device to determine the amino acid sequence of the polypeptide.

In various embodiments the electron transfer dissociation product cations can be m/z sequentially ejected from said RF containment device to an ion detector.

In various embodiments, the polycyclic aromatic hydrocarbon can be azulene. Azulene is particularly suitable for the method disclosed and claimed herein due to its propensity to donate an electron to the polycation, such as a polypeptide polycation, rather than to abstract a proton; the relatively high volatility of azulene, the relatively low molecular weight of azulene, and the relatively non-toxic, non-carcinogenic properties of azulene. The relatively benign health profile of azulene serves to allow less stringent handling by personnel. Azulene is commercially available and relatively inexpensive.

In various embodiments, the polycyclic aromatic hydrocarbon can be acenaphthylene. Acenaphthylene is particularly suitable for the method disclosed and claimed herein due to its propensity to donate an electron to the polycation, such as a polypeptide polycation, rather than to abstract a proton; the relatively high volatility of acenaphthylene, the relatively low molecular weight of acenaphthylene, and the relative non-toxic nature of acenaphthylene. Acenaphthylene is commercially available and relatively inexpensive.

In various embodiments, the polycyclic aromatic hydrocarbon can be homoazulene. Homoazulene is thought to be particularly suitable for the method disclosed and claimed herein due to its propensity to donate an electron to the polycation, such as a polypeptide polycation, rather than to abstract a proton; the relatively high volatility of homoazulene, and the relatively low molecular weight of homoazulene. Homoazulene, however, is not known to be commercially available, and is of unknown toxicity.

In various embodiments, the polycyclic aromatic hydrocarbon can be any of the various homodimers or heterodimers of azulene, homoazulene, or acenaphthylene. Any of these dimers is particularly suitable for the method disclosed and claimed herein due to their propensity to donate an electron to the polycation, such as a polypeptide polycation, rather than to abstract a proton. These compounds can form di-radical anions, which are advantageous for certain applications. Due to the double negative charge, the m/z ratio of dimers is approximately the same as those of the monomeric polycyclic aromatic hydrocarbons discussed above.

In various embodiments, a mixture of any of the polycyclic aromatic hydrocarbons azulene, homoazulene, or acenaphthylene, their homodimers, or their heterodimers, in any relative amounts, can be used. These compounds can form di-radical anions, which are advantageous for certain applications. Any of the dimers however have higher molecular weights and lower volatilities than any of the three monomeric polycyclic aromatic hydrocarbons azulene, homoazulene, or acenaphthylene.

In various embodiments, the invention provides a kit comprising a polycyclic hydrocarbon selected from the set consisting of azulene, homoazulene, acenaphthylene, a homodimer of any of azulene, homoazulene, or acenaphthylene, and a heterodimer comprising one each of azulene, homoazulene, or acenaphthylene, or any mixture thereof, wherein the hydrocarbon is packaged in a manner such that it is adapted for use in a mass spectrometer. The kit can further comprise instructional material.

While the invention has been described and exemplified in sufficient detail for those skilled in this art to make and use it, various alternatives, modifications, and improvements will be apparent to those skilled in the art without departing from the spirit and scope of the claims.

All patents and publications are herein incorporated by reference to the same extent as if each individual publication was specifically and individually indicated to be incorporated by reference.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed can be resorted to by those skilled in the art, and that such modifications and variations are considered to be within the scope of this invention as defined by the appended claims.

PUBLICATIONS

1. Tolmachev, A. V., H. R. Udseth, and R. D. Smith, *Radial stratification of ions as a function of mass to charge ratio in collisional cooling radio frequency multipoles used as ion guides or ion traps*. Rapid Commun Mass Spectrom, 2000. 14(20): p. 1907-13.
2. Gunawardena, H. P., et al., *Electron transfer versus proton transfer in gas phase ion/ion reactions of polyprotonated peptides*. J Am Chem Soc, 2005. 127(36): p. 12627-39.
3. Syka J E P, Coon J J, Schroeder M J, Shabanowitz J, Hunt D F. Peptide and Protein Sequence Analysis by Electron Transfer Dissociation Mass Spectrometry. *Proc Natl Acad Sci USA* 2004; 101:9528-9533.
4. Coon J J, Ueberheide B, Syka J E P, Dryhurst D D, Ausio J, Shabanowitz J, Hunt D F. Protein Identification Using Sequential Ion/Ion Reactions and Tandem Mass Spectrometry. *Proc Natl Acad Sci USA* 2005; 102:9463-9468.
5. Udeshi N D, Shabanowitz J, Hunt D F, Rose K L. Analysis of Proteins and Peptides on a Chromatographic Timescale by Electron-Transfer Dissociation MS. *FEBS J.,* 2007, 274, 6269-76.

What is claimed is:

1. A method of mass spectrometry analysis based on electron transfer dissociation (ETD) of multiply charged organic and/or biomolecular cations, the method comprising the steps of (a) introducing the multiply charged cations into an RF electric field ion containment device of a mass spectrometer; and introducing polycyclic aromatic hydrocarbon anions as gas-phase electron transfer reagents into the ion containment device, wherein the polycyclic aromatic hydrocarbon anions are anions of polycyclic aromatic hydrocarbons selected from the set consisting of azulene, homoazulene, acenaphthylene, a homodimer of any of azulene, homoazulene, or acenaphthylene, and a heterodimer comprising one each of azulene, homoazulene, or acenaphthylene; or any mixture thereof; and then (b) mixing the introduced polycyclic aromatic hydrocarbon anions or derivative anions thereof, and the multiply charged cations or derivative multiply charged cations thereof, wherein the derivative anions and the derivative multiply charged cations are generated within the ion containment device during performance of the method, for electron transfer from the polycyclic aromatic hydrocarbon anions or the derivative anions thereof to the multiply charged cations or the derivative multiply charged cations thereof, to induce cleavage of covalent bonds and produce fragment and/or dissociation product cations; and mass (m/z) analyzing and detecting said fragment and/or dissociation product cations or cations derived from the fragment and/or dissociation product cations for mass spectrometric analysis.

2. The method of claim 1 wherein the multiply charged cations comprise a multiply charged cation derived from a polypeptide.

3. The method of claim 1 wherein the RF electric field ion containment device is an RF ion guide.

4. The method of claim 1 wherein the RF electric field ion containment device is an RF ion trap.

5. The method of claim 4 wherein the RF ion trap is a RF linear multipole ion trap.

6. The method of claim 4 wherein the RF ion trap is a RF 3 dimensional multipole ion trap.

7. A method for analyzing the amino acid sequence of a polypeptide, the method comprising introducing multiply charged polypeptide cations into an RF containment device; and introducing gas-phase anions into the RF containment device, wherein the anions are radical anions derived from a polycyclic aromatic hydrocarbon selected from the set consisting of azulene, homoazulene, acenaphthylene, a homodimer of any of azulene, homoazulene, or acenaphthylene, and a heterodimer comprising one each of azulene, homoazulene, or acenaphthylene, or any phenyl mono- or plurisubstituted derivative thereof, or any mixture thereof; and then mixing gas-phase anions and multiply charged polypeptide cations for electron transfer from the anions to the multiply charged polypeptide cations, thus inducing the production of electron transfer dissociation product ions; then terminating the reactions by physically separating the remaining gas-phase anions from the electron transfer product cations; and conducting m/z analysis of cations remaining in the RF containment device to determine the amino acid sequence of the polypeptide.

8. The method of claim 7 wherein the electron transfer dissociation product cations are m/z sequentially ejected from the RF containment device to an ion detector.

* * * * *